May 19, 1936. H. BECKER 2,040,972
PISTON
Filed April 16, 1932
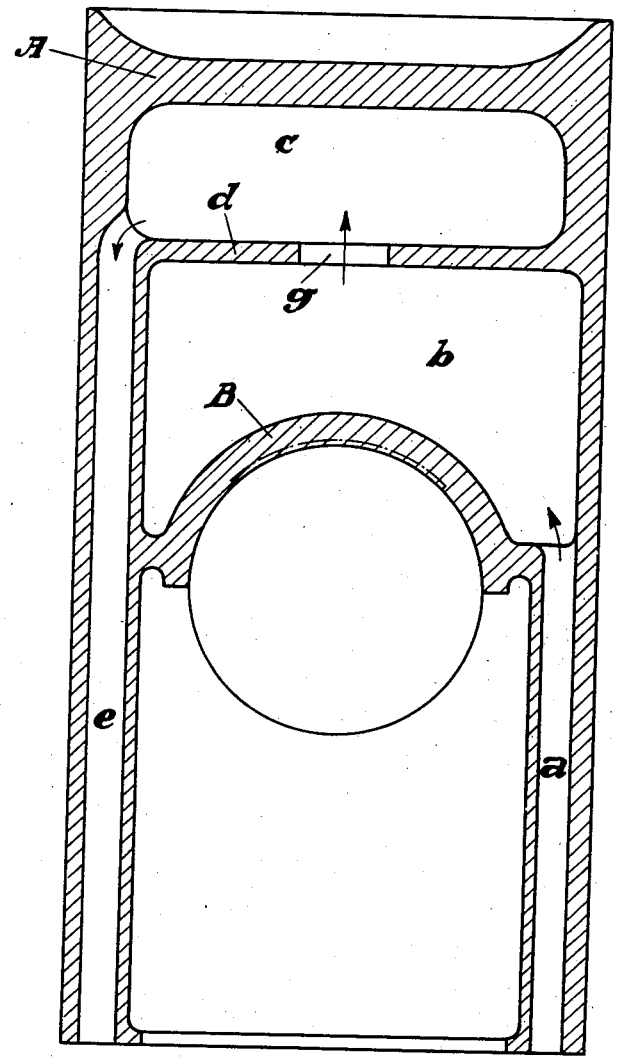
Inventor
Heinrich Becker
by Maréchal & Noe
attorneys.

Patented May 19, 1936

2,040,972

UNITED STATES PATENT OFFICE 2,040,972

PISTON

Heinrich Becker, Augsburg, Germany, assignor to Maschinenfabrik Augsburg-Nurnberg A. G., Augsburg, Germany, a corporation of Germany Application April 16, 1932, Serial No. 605,557
In Germany May 4, 1931

5 Claims. (Cl. 123—176)

This invention relates to engine pistons and more particularly to the type of piston in which there is an internal chamber for cooling medium.

One object of the invention is the provision of a piston of the character mentioned having a cooling medium chamber extending along the wrist pin bearing wall in such a way as to provide for effective cooling of the wrist pin bearing surface.

Another object of the invention is the provision of an engine piston adapted to be cooled by a flow of cooling medium, the piston having a chamber extending to the piston head and also partly defined by a wrist pin bearing wall which extends across the piston.

Another object of the invention is the provision of a piston of the character mentioned having a cooling chamber which is divided by a partition so that oil or other cooling medium is supplied to the portion of the chamber defined in part by the wrist pin bearing wall, the piston head portion of the chamber being connected to the outlet passage.

Other objects and advantages of the invention will be apparent from the following description, the appended claims and the accompanying drawing.

The drawing shows a central vertical section of a piston embodying the present invention.

Referring more particularly to the drawing by reference letters, the piston as herein shown is adapted for use in an internal combustion engine, the piston being hollow or chambered so as to provide for a flow of cooling medium. The piston of the present invention is particularly adapted for two cycle engines, in which every second stroke is a working stroke, and in which no change in pressure direction takes place in the wrist pin bearing. In such engines it is only that side of the wrist pin bearing adjacent the piston head to which the forces are applied, and it has been difficult to adequately lubricate this bearing in accordance with prior practices. It has also been difficult to adequately design the bearing to take up the great stresses to which it is subjected and which result from the pressures of the burning gases on the piston head. In the case of Diesel engines for example, having a relatively small surface contact between the wrist pin and the piston, the forces are often so great as to cause the wrist pin bearing to run very hot, and result in bursting of the piston.

In accordance with the present invention, the wrist pin bearing surface of the piston is effectively cooled and adequately proportioned so as to operate satisfactorily under the large pressure strains to which it is subjected, especially at full load and high speed. The piston body A is provided with a wrist pin bearing wall B which extends across the piston, its end portions being provided by the circular openings in the cylindrical wall which receive the ends of the wrist pin. The bearing wall B is preferably cast integrally with the piston walls and with the piston head, and as shown, provides a large size semi-cylindrical bearing surface extending the full piston diameter. The upper end of the connecting rod may be inserted through the open lower end of the piston and fixed to a flat part of the wrist pin which is passed through the openings in the piston skirt. The piston is hollow between the piston head and the bearing wall B, providing a space for cooling liquid such as oil or other cooling medium. This cooling medium may be supplied to the lower part of the cooling medium chamber through a passage $a$, while an outlet passage $e$ is provided in the opposite side of the piston wall, this outlet passage extending up to a point adjacent the piston head. The cooling liquid is forced to the inlet passage $a$ by any suitable means. The cooling medium chamber is preferably divided into two spaces by means of a partition wall $d$ arranged between the piston head and the wrist pin bearing wall B. An opening $g$ is provided in the partition wall so that the cooling medium may flow from the wrist pin chamber $b$ to the piston head chamber $c$.

It will be apparent that as the cooling medium is supplied to the chamber portion $b$ it will absorb heat from the wrist pin bearing wall B. The cooling medium, in its passage through the piston, will then flow up through the opening $g$ to the piston head chamber portion $c$ and absorb heat from the piston head before it flows out through the outlet passage $e$.

While the form of construction herein described constitutes a preferred embodiment of the invention, it is to be understood that the invention is not limited to this precise form, and that changes may be made therein without departing from the scope of the invention which is defined in the appended claims.

What I claim is:

1. An engine piston having a head wall, a wrist pin bearing wall and a skirt wall, said piston having a chamber for cooling liquid extending up to the head wall and also extending along the wrist pin bearing wall, and a partition wall in said chamber extending substantially transverse of the piston axis between the head wall and the wrist pin bearing wall, said partition wall having an opening providing for flow of the cooling medium, a supply pipe for continuously supplying cooling liquid to a point in said chamber at one side of said partition wall adjacent the wrist pin bearing wall, and a liquid withdrawing passage extending from said chamber from a point adjacent the other side of said partition wall.

2. An engine piston having a wrist pin bearing wall provided as a part thereof and providing a cylindrically concave bearing surface extending across the piston, said piston having a chamber for the circulation of cooling medium extending up to the piston head and extending along said wrist pin bearing wall, a partition wall in said chamber provided between the piston head and the bearing wall and partitioning said chamber into a bearing wall portion and a piston head portion, said partition having an opening therein, a cooling medium supply passage in communication with said bearing wall portion of the chamber, and an outlet passage for the cooling medium in communication with said piston head chamber portion.

3. An engine piston having a wrist pin bearing wall as an integral part thereof and providing a cylindrically concave bearing surface extending entirely across the piston for direct bearing engagement with substantially the entire upper half of the wrist pin, said piston having a chamber for cooling liquid which extends up to the piston head and which also extends continuously along said wrist pin bearing wall, a supply pipe for supplying cooling liquid to a point in said chamber adjacent said bearing wall, and a liquid withdrawing passage extending from said chamber.

4. An engine piston having a wrist pin bearing wall as an integral part thereof and providing a cylindrically concave bearing surface extending entirely across the piston rod opening for direct bearing engagement with substantially the entire upper half of the wrist pin, said piston having a chamber for cooling liquid extending along said wrist pin bearing wall, a supply passage for continuously supplying cooling liquid to a point in said chamber adjacent said bearing wall, and a liquid withdrawing passage extending from a point in said chamber adjacent the head end of the piston.

5. An engine piston having a wrist pin bearing wall as an integral part thereof and providing a cylindrically concave bearing surface extending entirely across the piston for direct bearing engagement with substantially the entire upper half of the wrist pin, said piston having a chamber for cooling liquid which extends up to the piston head and which also extends continuously along said wrist pin bearing wall and of considerable length in the direction of the piston axis, a supply passage formed in the piston wall at a side of said concave bearing surface for supplying cooling liquid to a point in said chamber adjacent said bearing wall, and a liquid withdrawing passage extending from said chamber.

HEINRICH BECKER.